United States Patent

[11] 3,624,313

[72] Inventor Heinz A. DeKoster
Stamford, Conn.

[21] Appl. No. 833,474
[22] Filed June 16, 1969
[45] Patented Nov. 30, 1971
[73] Assignee Seggos Industries, Incorporated
Stamford, Conn.

[54] COMBINED INDUCTIVE AND FLUX-RESPONSIVE TRANSDUCER
4 Claims, 5 Drawing Figs.

[52] U.S. Cl. .......... 179/100.2CH, 179/100.2 S
[51] Int. Cl. .......... G11b 5/30, G11b 15/46
[50] Field of Search .......... 179/100.2 C, 100.2 CF, 100.2 CH, 100.2 S; 340/174.1 F; 346/74 MC

[56] References Cited

UNITED STATES PATENTS

| | | | |
|---|---|---|---|
| 2,978,545 | 4/1961 | Howling .......... | 179/100.2 |
| 3,274,575 | 9/1966 | DeKoster .......... | 179/100.2 |

FOREIGN PATENTS

| | | | |
|---|---|---|---|
| 876,824 | 9/1961 | Great Britain .......... | 179/100.2 |

*Primary Examiner*—Bernard Konick
*Assistant Examiner*—Robert S. Tupper
*Attorneys*—Louis Altman and Mattern, Ware & Davis

ABSTRACT: Inductive transducing means and flux-responsive transducing means are connected in any one of a variety of ways so that the relationship between their respective outputs provides information which neither transducing means alone could provide. In particular, both transducing means may be incorporated in a single magnetic sensing unit so as to sense the same or correlated signals upon a magnetic record. The difference between the flux-responsive output and the inductive output then indicates the speed of the magnetic information carrier, and can be used in a servo loop to control and/or indicate such speed.

INVENTOR.
Heinz A. DeKoster
BY Louis Altman
Att'y

INVENTOR.
Heinz A. DeKoster
BY Louis Altman
Att'y

INVENTOR.
Heinz A. DeKoster
BY Louis Altman
Att'y

COMBINED INDUCTIVE AND FLUX-RESPONSIVE TRANSDUCER

FIELD OF THE INVENTION

The invention relates generally to the field of transducing devices, and is particularly concerned with magnetic recording and reproducing equipment, and speed controls therefor.

THE PRIOR ART

The magnetic transducer which is most widely used in the magnetic recording and reproducing arts is the inductive type, which by its physical nature produces a voltage output proportional to the time rate of change of flux, $d\Phi/dt$. Such transducers are subject to the disadvantage that their output magnitude is dependent upon maintaining an accurate transport speed for the magnetic tape, disc, drum or other recording medium during both recording and reproducing. Apart from the other undesirable results produced by an error in recording or reproducing speed, the output voltage will vary objectionably as a result of such speed errors. An additional disadvantage of inductive sensors resides in the fact that they have an inherent tendency to produce higher voltage outputs at higher signal frequencies, owing to the inherently greater time rate of change of flux which occurs at those frequencies for a given signal amplitude.

For these and other reasons, some effort has been made to design magnetic reproducing equipment employing transducers which respond directly to the instantaneous value of the flux $\Phi$ rather than to its time differential $d\Phi/dt$. When magnetic sensing heads of this type are used to reproduce a magnetic recording, the output voltage is more nearly constant over a range of signal frequencies and recording or reproducing speeds.

There are at least three different types of flux-responsive magnetic-sensing heads capable of performing in the above manner, but none of them has the inherent capacity to record a magnetic signal as well as to reproduce it. Furthermore, there remains a need to control the speed of a magnetic recording medium during recording and reproduction. For example, if the reproduction speed does not match the recording speed, voice and musical notes will not be reproduced at the proper pitch, regardless of the type of transducer employed. A disadvantage of prior art flux-responsive transducers is that they do not provide a convenient way to control the speed of the recording medium.

In the past, transport speed has been controlled during the recording process by "writing" a standard frequency signal on the extra track of the magnetic recording medium, while simultaneously playing it back and using a frequency comparator to compare the reproduced version with the direct output of the standard frequency source. Equal frequencies thus indicate correct recording speed, and a frequency differential indicates a speed error. The difficulty with this system is that it requires a separate track on the magnetic record, separate recording and reproducing heads, a standard frequency signal generator, and a frequency comparator. It is therefore quite expensive.

During reproduction, the standard approach is to govern the transport speed by reference to a local frequency standard which is either generated internally or derived from power lines. Neither of these approaches govern the reproducing speed by reference to the magnetic recording itself.

SUMMARY AND OBJECTS OF THE INVENTION

In general terms, the objective of this invention is to combine signal responsive and rate of change responsive transducer outputs in such as way as to generate additional information which neither transducer output alone could provide. In more specific terms, it is an object of this invention to provide a magnetic transducer which reads a signal and the rate of change of the signal simultaneously, and combines the two outputs to achieve superior recording and/or reproducing performance.

One benefit of this approach is more precise speed control during both the recording and reproducing processes, achieved by reference to the magnetic record itself rather than to some other standard. Another benefit is near elimination of the dependence of output voltage upon transport speed and signal frequency, but without sacrificing the magnetic writing benefit is compensation for a certain amount of output reduction which occurs at high frequencies even with flux-responsive transducers.

The invention is realized in the form of a combination transducer comprising means for producing an output which is a function of the rate of change of a signal, means for producing an output which is a function of the signal itself, and means responsive to both of these outputs, such as a speed control servo.

BRIEF DESCRIPTION OF THE DRAWINGS

The same reference characters refer to the same elements throughout the several view of the drawing.

DETAILED DESCRIPTION OF THE PREFERRED EMBODIMENT

Figure 1:
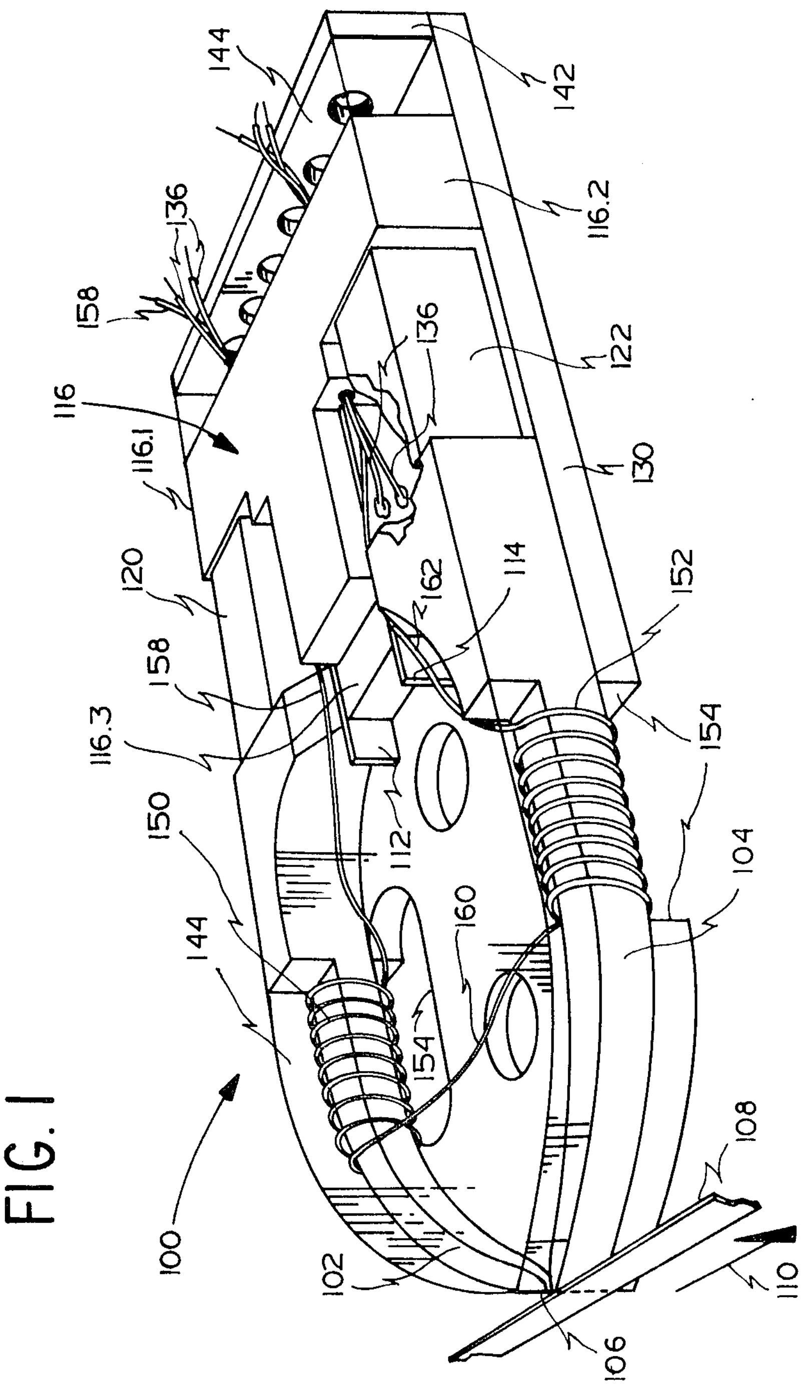
FIG. 1 is a perspective view of a magnetic recording and reproducing head in accordance with the present invention.
Figure 2:
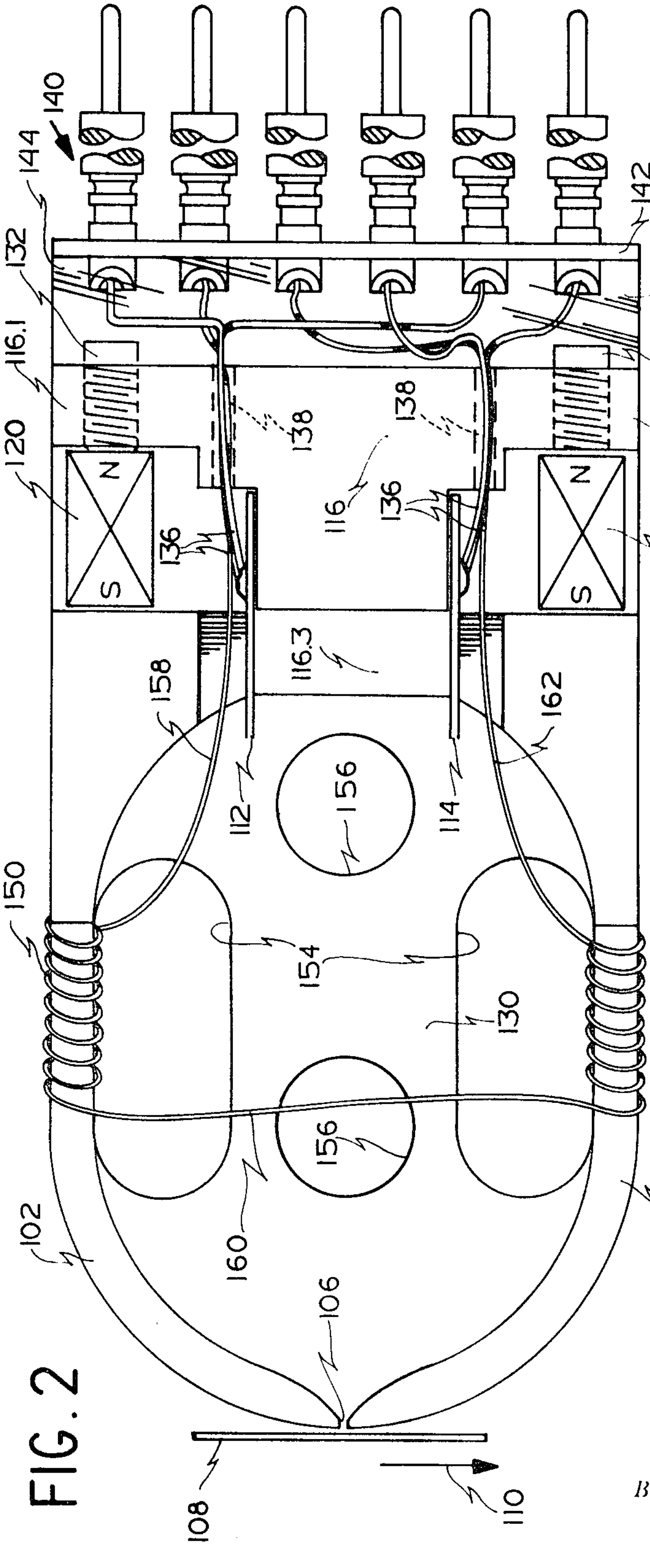
FIG. 2 is a top plan view of the same magnetic head.
Figure 3:
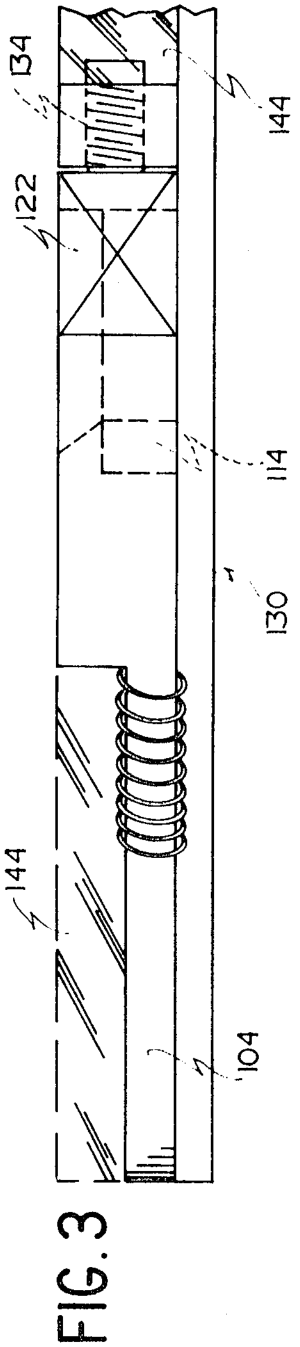
FIG. 3 is a side elevational view of the magnetic head.

The art is aware of a number of different flux-responsive transducers, i.e., those which respond to the absolute level of flux, rather than to its rate of change with respect to time. One of the best known flux-responsive transducers is the Hall effect device, in which transverse electric and magnetic fields interact to produce an output voltage.

The Sony Corporation of Japan has recently introduced a device referred to as a magnetodiode, which is a semiconductor diode having a region where holes and electrons are more likely to recombine. The effect of a magnetic field upon the diode is to deflect charge carriers toward that region. The stronger the magnetic field is, the more charge carriers are deflected and removed from circulation by recombination. The conductivity of the diode thus varies in proportion to the strength of the magnetic field.

Although either of these devices can be employed in the present invention, the preferred flux-responsive transducer is a magnetoresistive device of the same general type as that described in U.S. Pat. Re. No. 26610, based on original U.S. Pat. No. 3,274,575. As described in the above reissue patent, this type of transducer is adapted for reproducing magnetic recording from a tape, drum, disc, or the like, and includes a pair of pole pieces arranged to form an airgap which picks up the signal flux. The flux is then conducted through one or more semiconductive, magnetoresistive film elements preferably arranged so that the magnetic circuit has a bridgelike configuration. The magnetoresistive elements are also electrically connected in a Wheatstone bridge, where they add their output to produce a strong response which is proportional to the signal flux rather than to its rate of change.

In accordance with this invention, a magnetic recording and reproducing head 100 incorporates basically the same type of magnetoresistive bridge transducer. The device includes a pair of pole pieces 102 and 104, the tips of which approach each other closely across a small airgap 106 to pick up the signal flux recorded upon a magnetic tape 108 which is moved in the direction of arrow 110 by a conventional tape transport. At the rear end of the pole pieces 102 and 104 are magnetoresistive elements of the type described in the above reissue patent, which are deposited upon ferromagnetic substrates 112 and 114 respectively. A T-shaped keeper 116 comprises a pair of side legs 116.1 and 116.2, and a center leg 116.3 which is interposed between the ends of the respective pole pieces 102 and 104 to complete the magnetic circuit of the signal flux picked up from the tape 108. Thus the flux circuit runs from airgap 106 through pole piece 102 and magnetoresistive element 112 to member 116.3, then through magnetoresistive element 114 and back through pole piece 104 to the airgap 106. In passing through the magnetoresistive elements 112 and 114, the signal flux affects their electrical resistances so as to produce a detectable effect in the electric circuit connected to the two elements.

A biasing flux for the two magnetoresistive elements 112 and 114 is provided by a pair of permanent magnets 120 and 122 which are situated between the rear end of pole piece 102 and side leg 116.1, and the rear end of pole piece 104 and the side leg 116.2 respectively. The magnetic circuit of permanent magnet 120 passes through side leg 116.1 and center leg 116.3 to magnetoresistive element 112, and then returns through the rear end of pole piece 102 to permanent magnet 120. The magnetic circuit of magnet 122 similarly passes through side leg 116.2 and center leg 116.3 to magnetoresistive element 114, and then returns through the rear end of pole piece 103 to the permanent magnet 122.

Thus it is seen that the biasing fluxes of the two permanent magnets proceed in a common direction along the center leg 116.3 but then split off in opposite directions to bias the respective magnetoresistive elements 112 and 114. As a result, for any given instantaneous signal flux direction, the biasing flux of one of the permanent magnets opposes and the biasing flux of the other permanent magnet aids the signal flux. The result is differential magnetic signals applied to the respective elements 112 and 114, to produce opposite effects on their respective electrical resistances. The two elements are connected to a Wheatstone bridge circuit in such a manner that these opposite electrical effects are additive in their influence upon the bridge output.

The above-described components of the magnetic head 100 are conveniently supported upon a brass plate 130. Setscrews 132 and 134 pass through the side legs 116.1 and 116.2 respectively to adjust the airgap between the side legs and their respective biasing magnets 120 and 122. Electrical leads 136 are soldered to the respective magnetoresistive elements 112 and 114, and are brought out through holes 138 formed in the T-shaped member 116. These leads are connected to respective pins 140 of a conventional electrical connector mounted upon a phenolic board 142, which also rests upon the brass plate 130.

An inductive transducer is added to the head 100 by wrapping a coil 150 about pole piece 102 and another winding 152 wrapped about pole piece 104. The brass plate 130 is formed with cutouts 154 to permit the windings to encircle the pole pieces. Additional cutouts 156 are formed in the brass plate 130 for the sake of reducing the weight and cost of the device. A lead 158 comes from one of the connecting pins 140 through one of the holes 138 to coil 150. Lead 160 connects coil 150 in series with coil 152. Finally, another lead 162 goes back from coil 152 through another hole 138 to another of the connecting pins 140. Thus there are a total of six output leads and six connecting pins 140 emerging from the transducer device 100, four leads for the magnetoresistive elements 112 and 114, and two leads for the series combination of inductive coils 150 and 152.

The purpose of the windings 150 and 152 is to respond in the usual manner to the rate of change of the signal flux which traverses the pole pieces 102 and 104. Note that the windings 150 and 152 encircle their respective pole pieces 102 and 104 in opposite annular senses, but these winding directions are so related to the respective directions of the signal flux in pole pieces 102 and 104 that the voltages induced in the coils 150 and 152 are in series aiding relationship.

After assembly, and after adjustment of the setscrews 132 and 134, the entire device from the phenolic connector board 142 forward to the air gap 106 is potted in a conventional epoxy compound 144.

Figure 4:
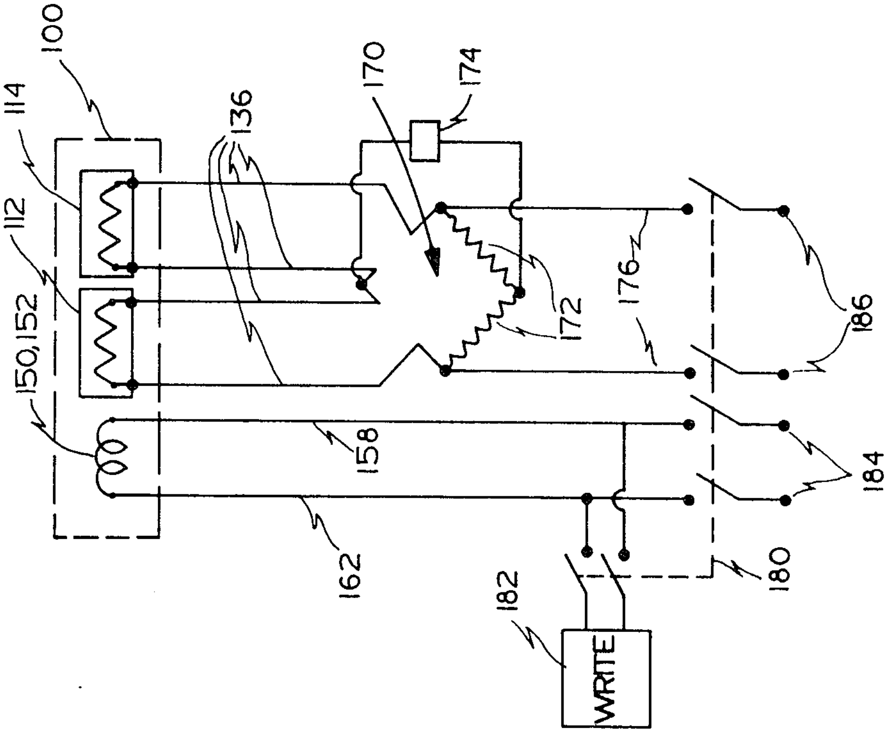
FIG. 4 is a schematic circuit diagram showing the electrical configuration of the magnetic head, and illustrating its use either for recording or for reproducing.

In FIG. 4 the electrical configuration of the combination inductive and flux responsive transducer 100 is shown, together with its output circuit. The latter comprises a Wheatstone bridge 170 comprising a pair of conventional resistors 172 as well as the magnetoresistances 112 and 114 connected in respective arms of the bridge. An AC or DC exciting source 174 of any convenient kind is connected across the bridge input terminals, while the bridge output terminals are connected to a pair of output leads 176 which carry the output of the flux-responsive portion of the combined transducer. 100. The leads 158 and 162 connected across the series combination of windings 150 and 152 carry the output of the inductive or rate of change portion of the combined transducer 100.

The combination flux responsive and rate of change responsive transducer 100 can accomplish a number of things that no magnetic transducer of any kind has ever done before. For one thing, it is the only flux-responsive device which is also capable of recording, as when the inductive portion 150, 152 thereof is connected by means of a switch 180 to a write circuit 182. The write circuit of course impresses a recording signal upon the windings 150 and 152, which then apply a recording flux by means of the pole pieces 102 and 104 to the airgap 106 for magnetizing the tape 108. In the other position of the switch 180, it disconnects the windings 150 and 152 from the write circuit 182, and connected the entire head 100 to the output terminals 184 and 186 which are used when the head functions in the reproducing mode.

In the reproducing mode the head of this invention again functions as no other has ever done before. Specifically, it provides two different outputs during the magnetic reproducing function, the output across terminals 186 being proportional to the flux $\Phi$, while the output across terminals 184 is proportional to the rate of change of flux $d\Phi/dt$. If these two outputs are connected to the same response circuit, some interesting results can be achieved. It was noted previously that an inductive magnetic sensor tends to produce a stronger output at higher signal frequencies because of the inherently greater rate of flux change at such frequencies. Flux-responsive devices theoretically provide a relatively flat output over a range of frequencies, yet practically such devices include a certain amount of iron (for example the elements 104, 106 and 116 of the present device) so that the hysteresis losses are somewhat greater at higher frequencies. As a result, the decrease in the output of the flux-responsive portion of the head is roughly compensated by the increase in output of the inductive portion of the head. Thus, if the two outputs are connected in series aiding relationship to a voltage responsive device, a degree of frequency compensation is provided. Or if the head 100 is driving a current responsive device, then the outputs at terminals 184 and 186 are connected in parallel to achieve the same kind of frequency compensation.

Figure 5:
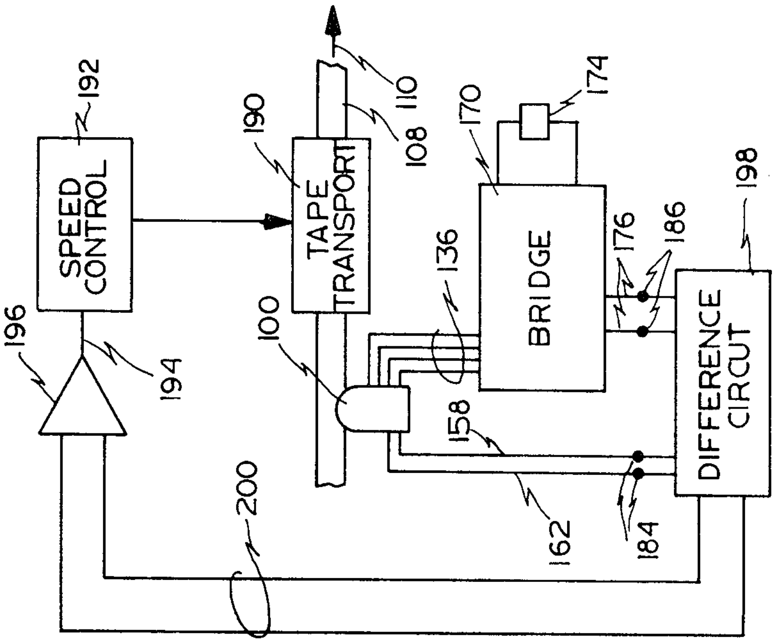
FIG. 5 is a schematic block diagram of a magnetic tape transport speed control loop employing the magnetic head of this invention.

Finally, the availability of both a flux-responsive output and a rate of change output provides a unique capability for governing the speed of the transport which drives the tape 108 or other magnetic recording medium. As seen in FIG. 5, a tape transport 190 moves the magnetic recording tape 108 in the direction indicated by arrow 110. The speed of the tape transport 190 is controlled by a circuit 192, which in turn is governed by a signal voltage applied to it over a lead 194 by a differential amplifier 196. The combined head 100 scans the tape 108 as it moves past, providing a rate of change output across leads 158 and 162, and a flux-responsive output on leads 176 emerging from the bridge circuit 170. A difference network 198 extracts the difference between the flux responsive and rate of change outputs, and applies this difference signal over leads 200 to the differential amplifier 196 so that the speed control signal developed by the amplifier is proportional to the difference between the flux responsive and rate of change outputs.

The flux-responsive output is practically constant over a small range of speeds of the tape transport 190. The rate of change output, on the other hand, varies as a function of the tape transport speed within that range. The circuit of FIG. 5 is so adjusted that when the tape transport 190 is operating at the desired speed the two outputs are equal, the difference signal developed by circuit 198 is zero and the amplifier 196 is quiescent, producing a zero correction signal on lead 194. But when the tape transport varies from the desired value, the rate of change output increases if the tape has speeded up and decreases if the tape has slowed down. Uder those circumstances, the difference network 198 produces an error signal on the leads 200, which is of the proper polarity to cause the amplifier 196 to issue a signal which corrects the speed error.

It will be appreciated that this speed control system operates without the need for a separate signal source, separate reading and writing heads, or frequency comparison circuitry. Moreover there is no need for a separate speed control track on the tape. The system functions instead by reading the information track or tracks with a single combination transducer assembly, and can obtain speed control information by comparing two outputs based upon the same recorded information.

Of, course, if it is desired, the flux responsive and rate of change transducers can be arranged to read different tracks on the tape, or even to read different magnetic recordings or signals from entirely disparate sources, depending upon the particular application.

Since the foregoing description and drawings are merely illustrative, the scope of protection of the invention has been more broadly stated in the following claims; and these should be liberally interpreted so as to obtain the benefit of all equivalents to which the invention is fairly entitled.

The invention claimed is:

1. A combination inductive and flux-responsive magnetic transducer for both reading and writing magnetic signals, comprising:

permeable means spaced to define a flux pickup gap therebetween:

a flux-responsive element having a first output circuit;

said permeable means being arranged to place said flux-responsive element in series magnetic circuit with said flux pickup gap;

an inductive winding about one of said permeable means which is also in series magnetic circuit with said same flux pickup gap;

a second output circuit for connection to said winding;

a magnetic signal writing circuit for driving said winding;

and switching means for connecting said winding alternatively to said writing circuit or to said second output circuit.

2. In a combination transducer for detecting at least one varying signal, of the type including an inductive transducer means for producing an electrical output proportional to the time differential of a flux, magnetoresistive transducer means for producing an electrical output proportional to the instantaneous value of a flux, an output circuit connected to respond to both said transducer outputs, and means arranged to pick up and conduct a signal flux, said inductive transducer means comprising at least one winding inductively coupled to said flux-conducting means and connected to said output circuit, said magnetoresistive transducer means being interposed in said signal flux conduction path whereby to sense the same magnetic signal as said winding, said flux-conducting means comprising a pair of pole pieces spaced to define a flux pickup gap therebetween, said winding encircling at least one of said pole pieces, said magnetoresistive transducer means comprising at least two magnetoresistive elements interposed between said pole pieces to sense the flux picked up in said gap, and magnetic biasing means comprising at least two permanent magnets and permeable means for conducting the flux of said magnets through said two elements in respective opposite directions to aid and oppose said signal flux respectively in its effect on the resistance of said elements; the improvement wherein:

respective ends of said pole pieces extend away from said flux pickup gap and into spaced relationship with each other;

said permeable means is a substantially T-shaped member having a center leg and opposed side legs, said center leg thereof being interposed between said spaced pole piece ends;

each of said magnetoresistive elements is interposed between a respective one of said pole piece ends and said center leg of said T-shaped member;

and each of said permanent magnets is interposed between a respective one of said side legs of said T-shaped member and a respective one of said pole pieces;

whereby said signal flux passes in a single instantaneous direction through said pole pieces, said magnetoresistive elements, and said center leg; while said permanent magnet flux splits off from said center leg to pass in opposite directions through respective magnetoresistive elements, pole pieces, and side legs.

3. A combination transducer and circuit for use as a speed control for a magnetic record transport mechanism comprising:

an element for producing an output which is a function of the rate of change of a signal;

an element for producing an output which is a function of the instantaneous value of said signal;

a transport mechanism for producing relative motion between a recording medium and said combination transducer whereby said combination transducer scans at least one signal recorded on said medium;

means for controlling the scanning speed of said transport mechanism in response to a control signal;

and an output circuit arranged so as to develop a signal which is a function of the difference between said two element outputs, and to apply said difference signal to said speed control means as said control signal to govern the speed of said transport mechanism.

4. A combination transducer and circuit for use as a speed control for a magnetic record transport mechanism; comprising:

an inductive element for producing an electrical output proportional to the time differential of a flux;

an element for producing an electrical output proportional to the instantaneous value of a flux;

a circuit connected to respond to both said element outputs;

a transport mechanism for producing relative motion between a magnetic recording medium and said combination transducer whereby said combination transducer scans at least one magnetic signal recorded on said medium;

and means for controlling the scanning speed of said transport mechanism in accordance with an electrical signal;

said output circuit being so arranged as to develop a signal which is a function of the difference between said two element outputs, and to apply said difference signal to said speed control means to govern the speed of said transport mechanism.

* * * * *